United States Patent
Ter Schure (10) Patent No.: US 10,277,738 B2
(45) Date of Patent: Apr. 30, 2019

(54) MOBILE DEVICE AND SERVER FOR VOICE AND/OR DATA EXCHANGE

(71) Applicant: VIPCONN B.V., Zwolle (NL)

(72) Inventor: Petrus Siebrandus Ter Schure, Zwolle (NL)

(73) Assignee: Vipconn B.V., Zwolle (NL)

( * ) Notice: Subject to any disclaimer, the term of this patent is extended or adjusted under 35 U.S.C. 154(b) by 0 days.

(21) Appl. No.: 15/129,678

(22) PCT Filed: Mar. 28, 2014

(86) PCT No.: PCT/NL2014/050194
§ 371 (c)(1),
(2) Date: Sep. 27, 2016

(87) PCT Pub. No.: WO2015/147634
PCT Pub. Date: Oct. 1, 2015

(65) Prior Publication Data
US 2017/0134576 A1    May 11, 2017

(51) Int. Cl.
*H04M 3/493*    (2006.01)
*H04L 29/08*    (2006.01)
(Continued)

(52) U.S. Cl.
CPC ........ *H04M 3/4933* (2013.01); *H04L 67/141* (2013.01); *H04M 1/274516* (2013.01);
(Continued)

(58) Field of Classification Search
CPC ........................... H04M 3/4933; H04L 67/141
See application file for complete search history.

(56) References Cited

U.S. PATENT DOCUMENTS

| 6,647,107 B1 * | 11/2003 | Horrer ............. H04M 3/51 379/214.01 |
| 8,031,855 B2 * | 10/2011 | McGrath .......... H04M 3/42 379/218.01 |

(Continued)

FOREIGN PATENT DOCUMENTS

| EP | 1 603 318 A2 | 12/2005 |
| JP | 2004245668 A | 9/2004 |

(Continued)

OTHER PUBLICATIONS

International Search Report, dated May 30, 2014, from corresponding PCT Application.
(Continued)

*Primary Examiner* — Christopher M Brandt
(74) *Attorney, Agent, or Firm* — N.V. Nederlandsch Octrooibureau; Catherine A. Shultz; Tamara C. Stegmann (57) ABSTRACT

A mobile device (101) includes:
- a memory for storing contact information of the mobile device,
- a transceiver for exchanging voice and/or data signals within a telecommunications network, wherein the mobile device is configured to:
- provide (501, 513) the contact information to a server in the network,
- initiate (202), in response to a first user input, a first voice connection to the server; and
- at least one of
  - receive (2051), from the server, command data for initiating (2052) a second voice connection to a called party identified in the contact information; and
  - send (2054) authorization to the server to access user credentials included in the contact information.

19 Claims, 7 Drawing Sheets

(51) Int. Cl.
　　　*H04M 1/2745*　　(2006.01)
　　　*H04M 1/27*　　　(2006.01)
　　　*H04M 1/60*　　　(2006.01)

(52) U.S. Cl.
　　　CPC .......... *H04M 3/4935* (2013.01); *H04M 1/271* (2013.01); *H04M 1/6083* (2013.01); *H04M 2203/553* (2013.01); *H04M 2203/554* (2013.01); *H04M 2203/655* (2013.01); *H04M 2207/18* (2013.01)

(56) References Cited

U.S. PATENT DOCUMENTS

| | | |
|---|---|---|
| 2002/0196922 A1 | 12/2002 | Marwell et al. |
| 2004/0151300 A1 | 8/2004 | Marwell et al. |
| 2005/0047575 A1 | 3/2005 | Parker et al. |
| 2006/0080283 A1 | 4/2006 | Shipman |
| 2008/0175358 A1 | 7/2008 | Huang |
| 2008/0215442 A1 | 9/2008 | McGary et al. |
| 2011/0159853 A1 | 6/2011 | Stallings et al. |
| 2011/0170682 A1 | 7/2011 | Kale et al. |
| 2014/0302828 A1* | 10/2014 | Liu .................. H04W 4/16 455/415 |

FOREIGN PATENT DOCUMENTS

| | | |
|---|---|---|
| WO | 03/058926 A1 | 7/2003 |
| WO | 2008/103384 A2 | 8/2008 |

OTHER PUBLICATIONS

Singapore Search Report issued in Application No. 11201608047Y, dated Aug. 25, 2017.
Written Opinion issued in Application No. 11201608047Y, dated Aug. 28, 2017.

* cited by examiner

MOBILE DEVICE AND SERVER FOR VOICE AND/OR DATA EXCHANGE

TECHNICAL FIELD

The present invention relates to a mobile device and a server in a telecommunications network that allow a mobile device user to exchange voice and/or data services by giving control over the contact and message information of the mobile device to a human operator operating the server.

BACKGROUND OF THE INVENTION

Mobile devices are nowadays an important part of our daily lives. We make use of our mobile devices in almost any situation, even when it entails a risk for our safety and the safety of the people around us. One of these potentially dangerous situations is when driving for instance a car, a motorbike or a bicycle. Although people are aware of the dangers posed by using a mobile device while driving, people is often found dialing and sending messages while they are driving. This is especially noticeable with business people, who need to be contacting clients and travelling at the same time.

Although nowadays most phones have the option of using a voice command to dial a number, this function does not always provide an optimal result, especially when there are similar names on the address book and the function does not select the correct one. Background noises or not perfect pronunciation are some of the factors that can contribute to an incorrect result. This incorrect result leads, furthermore, to a consequent lack of focus of the driver, who re-attempts to make the call, causing a dangerous situation. There are also systems available for the car which display a user's phonebook on a screen of the car dashboard, allowing the user to search for a desired contact by scrolling the screen, but even in that case the user's eyes are not on the road, so a hazardous situation can arise.

In such scenarios where the driver must be highly focused, even the scrolling on the phone screen brings danger, being also a legally punished activity.

There are nonetheless more situations where it is desired to make use of the mobile device but our attention must be focused on something else, like when doing exercise, such as fitness training or jogging.

There is therefore a need for a system that allows people to make the maximum use of their mobile phones when performing focus-demanding activities without causing a hazardous situation.

SUMMARY OF THE INVENTION

The present invention provides a system that solves the abovementioned problem, by combining the current mobile device technology with the subtlety and personal touch of the human interaction.

The invention provides a mobile device comprising:
a memory for storing contact information of the mobile device,
a transceiver for exchanging voice and/or data signals within a telecommunications network,
the mobile device configured to:
provide the contact information to a server in the network,
initiate, in response to a first user input, a first voice connection to the server; and at least one of receive, from the server, command data for initiating a second voice connection to a called party identified in the contact information; and
send authorization to the server to access user credentials included in the contact information.

In the following description, the mobile device, which may be a mobile communication device, may also be referred to as mobile phone or only phone. However, the invention may also be applied to other types of mobile devices, provided said devices are capable of communication via a data network and setting up a voice connection with remote human operator. Examples include laptop computers and tablet computers.

The server may be a group of connected server devices. In particular the providing of contact information may be done with a first physical server device, whereas the voice connection is made with a second physical server device (such as a telephone switch). The operator connected to the second physical server to handle the voice communication with the user has access to the contact information via a connection with the first physical server. For ease of reference, all of these server devices may be collectively identified as "server" hereafter.

The invention provides a mobile device that can synchronize the contact and address book information of the mobile device user, including phone numbers and addresses of the contacts, with a server accessible from within the telecommunications network where the mobile device is. Furthermore, the mobile device can also synchronize user credentials for internet-based services, such as e-mail services like Gmail or Yahoo, social media services like Facebook, Twitter, LinkedIn or Instagram, instant messaging services such as Whatsapp, or the like. The server can also be referred to as VIPconn server throughout the present description. Equivalently, the user of the mobile device can be referred to as user or caller throughout the following description.

When the user is driving or performing another focus-demanding activity and he wants to make use of the mobile device to make a phone call, then the user does not need to search the phone number of the person he wants to reach, but instead he needs only contact the server, and the control of the user's contact information will be taken by the server.

In an embodiment according the invention, the mobile device is further configured to, when the mobile device is in a standby state, receive the first user input as a single button push action or a single screen tap action. This allows a user to quickly and safely (e.g. while driving) establish the voice connection.

In an embodiment according the invention, the mobile device is further configured to send the authorization to the server to access the user credentials after receiving a second user input. This allows for a secure mechanism for the server to have access to the user information, since the user credentials for the internet-based services can only be accessible after the user has sent his authorization. At the same time, it allows for a secure mechanism for the user to send the authorization in a quick and safe manner.

In an embodiment according the invention, the mobile device is configured to periodically perform the providing of the contact information to a server in the network. This way, up to date contact information is almost always available at the server. Only very recently changed information may take a short while before it is provided to the server. In an additional or alternative embodiment according the invention, the synchronization with the server is done whenever the mobile device has access to the Internet. This allows to reduce data traffic costs for the user. In yet another additional or alternative embodiment according the invention, the mobile device is configured to perform the providing of the contact information to a server in the network when the request of the user is received. This "just in time" provision ensures that the information at the server is up to date. However, it may cause a slight delay when the connection is setup.

In an embodiment according the invention, the mobile device is configured to stop providing the server with contact information when the first voice connection is completed. The contact and address book information may be stored in the server all the time, but the user credentials are not. Only when the connection between the mobile device and the server is established, the current unread e-mails, unread social network messages or tags or updates are displayed at the server side as pop up messages. That way, those messages can be operated from the server's side without the user having to reduce focus on his current activity.

In an embodiment according the invention, the mobile device is further configured to terminate the connection with the server at any time upon a third user input. This provides the user with total control over the communication with the server, since from the moment the user terminates the communication, the access to user credentials by the server, and therefore by the human operator, is closed.

In an embodiment according the invention, the contact information includes one or more of contact details including names and telephone numbers, address book information, e-mail messages, instant messaging information, and social networking information. For example, the contact information can include the required identification codes for interacting with the API or web server of a network service such as an email server, VoIP platform, Twitter, Facebook, Instagram, Whatsapp, etc.

In an embodiment according the invention, the mobile device is further configured to stop providing the server with contact information when the voice connection is completed.

In an embodiment according the invention, the mobile device is further configured to store information about the time of use of the voice connection.

In an embodiment according the invention, the voice connection with the server is a voice connection with a human operator connected to the server. The human operator can consult the contact information provided to the server. The human operator can then make the server issue the required command data.

In an embodiment according the invention, the provided contact information comprises encrypted information, and upon setup of the connection with the server, the mobile device sends a key for decrypting the encrypted information. This makes sure that personal data (the contact information) provided to the server remain unreadable for others until the moment the mobile device sends a decryption key.

The invention further provides a server, the server comprising:
  a transceiver for exchanging data signals within a telecommunications network,
  a memory for storing contact information;
  the server configured to:
  receive contact information from a mobile device in the network,
  receive a first voice connection from the mobile device; and performing a service,
    said service including at least one of
      sending command data from the server to the mobile device for initiating, by the mobile device, a second voice connection to a called party identified in the contact information; and
      receiving from the mobile device authorization to access user credentials based on the contact information and accessing an internet-based server using the user credentials.

When the connection between the mobile device and the server is established, and the caller is identified, with his information being localized in the memory, the server searches in memory an available human operator from a list, and connects the selected human operator with the caller, so that the operator can perform the task the caller is requesting. These tasks can be looking for a person in the contact and address book and dialing the correct number so that the caller can have a phone conversation with the desired person, answering an e-mail, posting a comment on Facebook or Twitter, uploading a picture to Instagram, or the like.

In an embodiment of the invention, when the human operator selects from the information related to the identified caller the contact that the caller wants to reach, the server establishes a connection between the caller and the selected contact. The user of the mobile device can thus speak to the requested contact without first having to search for the number himself.

In an embodiment of the invention, when the required service cannot be performed (e.g. the selected contact does not answer the phone), the server reconnects the human operator with the caller so that the human operator can request further instructions. In a further embodiment, when the second voice communication (the phone call) is ended, the operator may again be in contact with the user of the mobile device, so that the user can request from the operator a further service, like the reply of an e-mail, or another phone call.

In an embodiment of the invention, the server is further configured to stop being connected to the caller and stop having access to the messaging information of the caller when the service is completed. When the service requested by the user of the mobile device is completed, the human operator presses a button for termination of the connection, and the server stops the connection and stops having access to the messaging information of the user of the mobile device. The contact and address book information may still accessible by the server if such information is synchronized periodically and stored in the server.

In an embodiment according the invention, the server is configured to, when the service cannot be performed, re-establish the first voice connection so that the human operator can request further instructions from the user of the mobile device, such as retry or leave a voicemail.

In an embodiment according the invention, the server is configured to terminate the voice connection when the service is completed. The user can, however, at any time terminate the communication with the server, closing the access to the authorized user credentials. In an embodiment, the communication can be terminated by the same user interaction that started the setup of the first voice communication. This makes for an easy to remember user interface.

In an embodiment according the invention, the server is further configured to store information about the time of use of the service.

In an embodiment of the invention, the mobile device is further configured to store information about the time of use and type of the service. In order for the user to be able to keep track of the connections, the mobile device stores information about the time a conversation lasted, the time an Internet connection service lasted, and the type of service provided, such as reply to a Facebook private message, or post a message on Twitter.

In another embodiment according the invention, the server, when configured to receive from the mobile device authorization to access user credentials, eliminates said authorization when the service is completed. This allows for a secure service, wherein the user credentials are only accessible by the server while the communication is established.

In another embodiment according the invention, if contact information is not accessible from the mobile device, the server is further configured to provide the mobile device with the lastly received contact information. This allows for the mobile device to restore its contact information in case of loss due to for example a system format, and it also allows for the user to have his contact information updated in a new mobile device in case of a mobile device loss.

The invention further provides a computer program product comprising computer instructions which, when executed on a processor of a mobile device, cause said mobile device to function as described above. The invention further provides a computer program product comprising computer instructions which, when executed on a processor of a server, cause said server to function as described above.

The invention thus provides a mobile device wherein the connection with the server is a voice connection with a human operator that operates the server. When the connection between the mobile device and the server is established, the server connects the user of the mobile device with the operator. From that point, the operator takes control of the information that the mobile device has synchronized with the server, and that way the user can tell the operator the service that he wants: to make a call, to answer an e-mail or a message on a social network, or the like. The operator performs the required services, and when they are completed, the connection between the server and the mobile device is ended. The human operator, also referred to as operator, may be further identified as personal assistant, or PA.

The invention further provides a car system, the car system comprising a user interface, and a connection unit configured to be connected to the mobile device; wherein the connection between the connection unit and the mobile device is established in response to a user input to the user interface.

BRIEF DESCRIPTION OF THE DRAWINGS

On the attached drawing sheets.

DETAILED DESCRIPTION

Figure 1:
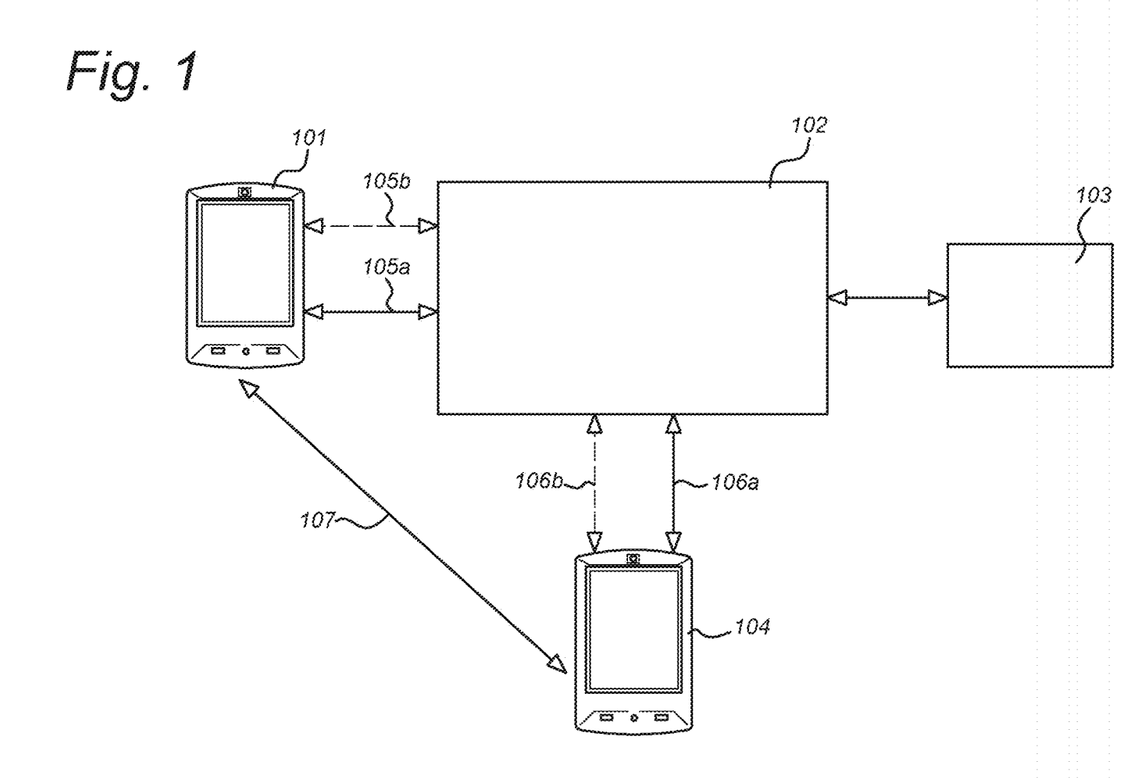
FIG. 1 illustrates a system for voice exchange according to an embodiment of the present invention.

FIG. 1 schematically shows a voice exchange system 100 according to an embodiment of the present invention. If the user of a mobile device 101 wants to initiate a service, he establishes a connection with the VIPconn server 102 via a user input that initiates a VIPconn application installed in the mobile device. This connection can run over a telephone network 105a, such as a Global System for Mobile Communications (GSM) network, over a voice and/or data network 105b, such as third generation (3G) network, over the Internet via Voice over Internet Protocol (VoIP), and the like.

The VIPconn application is therefore a software application that can be downloaded in a mobile terminal and that allows the connection of the mobile terminal with the VIPconn server. When the application is setup by the user, the default type of network connection may be preselected in the settings. Among the application settings there is also the possibility of selecting how the application will be initialized. This must be done in a simple way, because it is an objective of the present invention to avoid distractions from the user of the mobile terminal while driving or performing focus-demanding activities. The application may be initialized, starting from a standby status of the mobile device, with a single user interface action. With for example a double tap on the mobile device screen, even when the mobile device is locked, or the pressing of a specific button, the VIPconn application can be accessed. Those skilled in the art will understand that the mechanism for initializing the VIPconn can be any other simple tap combination or button pressing.

If the user is driving, the mobile device may be connected to the car via Bluetooth, and the user may even initialize the application by using the car buttons, not having to physically access the mobile device.

Once the connection has been established, the server retrieves the information related to the identified caller, localizes an available PA 103 who has access to the server, and establishes a first connection 107, usually a voice connection, between the user of the mobile device and the PA. The PA will also have access to the contact information that has been provided by the mobile device to the server. At that moment, the caller can tell the PA the service he is requesting, which can be for example to make a phone call, to reply to an e-mail or to post a message on Facebook. The PA can obtain the necessary contact details from the contact information.

If the caller whishes to establish a connection with a specific person, the PA 103 checks with the caller what type of network connection shall be established with the receiver, depending on the required service, such as making a phone or Skype call, sending an e-mail or SMS or sending a private message via Facebook. If no connection type is specified, the connection may be forced via telephone 106a.

The PA 103 has access to the information of the caller via a device connected to the server, said device being for example a computer, and on the device's screen, the available information is displayed: contact and address information from the caller's address book, Whatsapp, SMSs, e-mail accounts, Facebook, Twitter, LinkedIn, and so on. The access to the user credentials for the internet-based services, such as Facebook or Whatsapp, is however not authorized until the user sends an authorization to the server by means of a second user input.

In another embodiment of the present invention, such information is only available through the VIPconn application running in the PA 103 device, which is the same application as that running in the caller's mobile device 101. The PA has remote control of for example the caller's Facebook application, and when the PA updates information in the application, such as by posting a message, that information is remotely updated in the caller's application. Therefore, from an external point of view, is the caller himself who has posted that message.

Figure 2A:
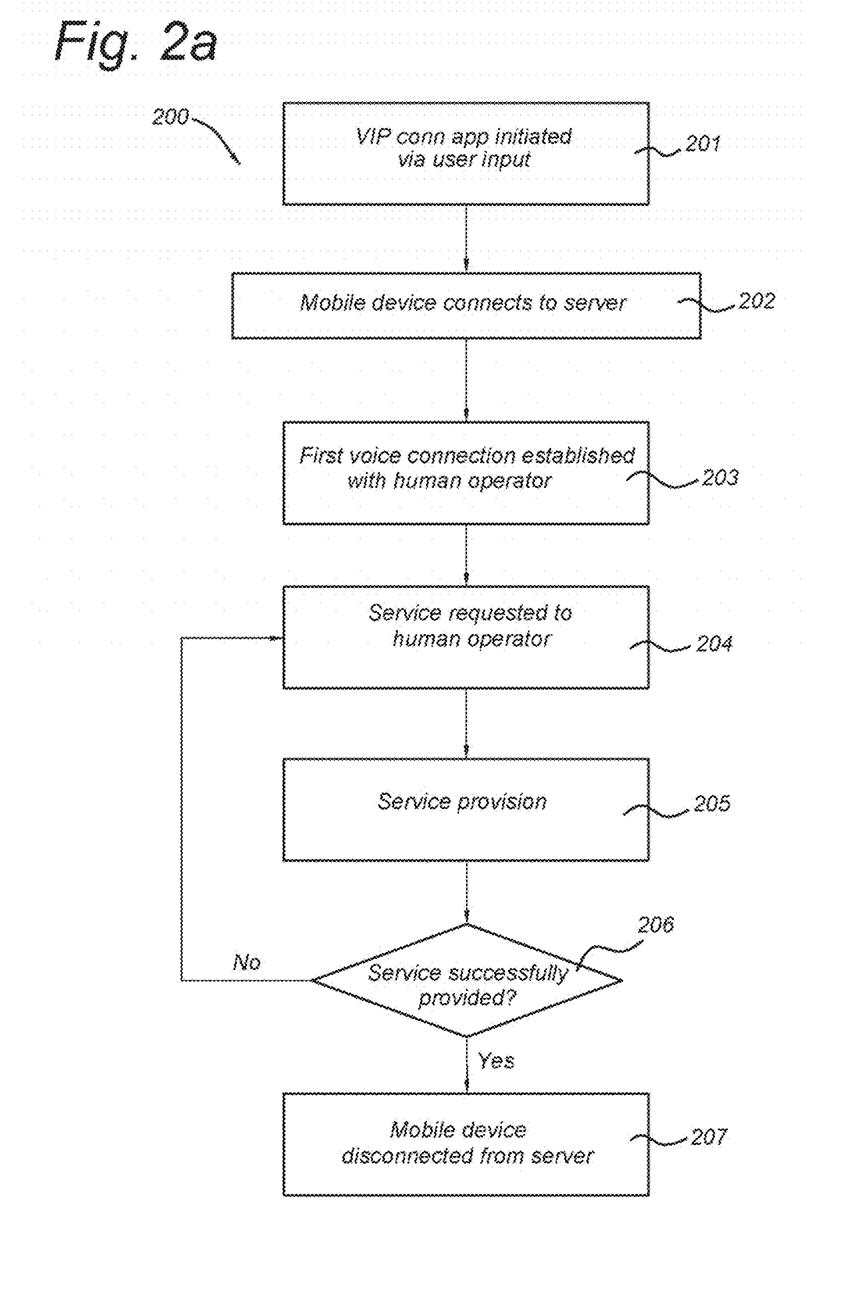
FIG. 2a shows a process performed by a mobile device according to an embodiment of the present invention.

FIG. 2a illustrates a process 200 performed by a mobile device whose user desires to exchange voice or data services according to an embodiment of the present invention. The user of the mobile device, who may be driving or performing another focus-demanding activity, desires to exchange voice or data services, such as call someone from his contact address book, or reply to an e-mail. The user of the mobile device is however busy and it is not safe to handle the mobile device in such situation. Therefore, in step 201 the user initiates the VIPconn application via a first user input, such as button push on a keyboard, a tap on a touch screen, or even a button in the car if the mobile device is connected to it via Bluetooth for example. This simple guarantees both a quick and safe establishment of the connection, not requiring the user to lose focus on his current activity.

In step 202, the application has been initialized and the connection with the VIPconn server is established, using, as already mentioned, a preselected network connection type. From that moment on, the user does not need to physically manipulate the mobile device. In step 203 a connection, which may be a voice connection, is established with a PA, who will have access to the user's contact information stored in the VIPconn server. The PA requests instructions from the user, and the user can easily explain 204 to the PA what activity he wants to perform, and which type of network he wants to use. When the PA has received the instructions from the user, he performs 205 the provision of the required service. If the service is not 206 successfully performed due to for example the receiver of a phone call not answering the phone, or due to network problems, the PA is reconnected to the caller in order to ask 207 for further instructions. When the service has 206 successfully been provided, the mobile device is disconnected 207 from the server and the communication with the PA is therefore terminated.

Figure 2B:
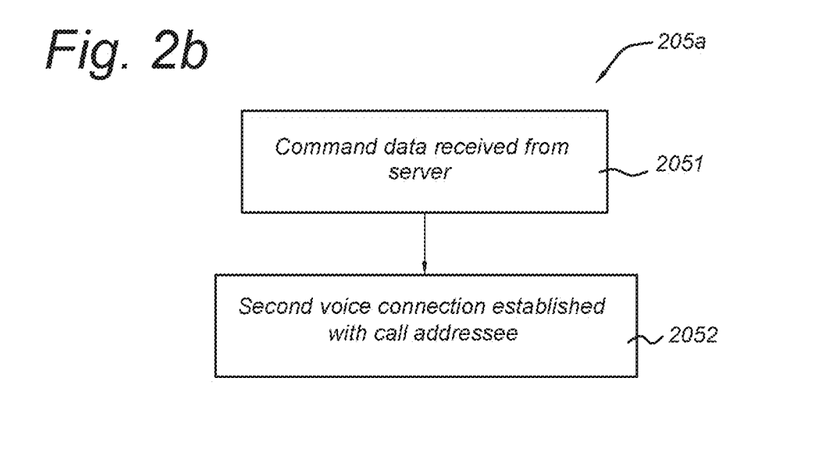
FIG. 2b shows a service provision process performed by a mobile device according to an embodiment of the present invention.

FIG. 2b shows a service provision process performed by a mobile device according to an embodiment of the present invention. In particular, it shows with detail the service provision of step 205 of FIG. 2a when the user requests a phone call. If the user wishes to call his work colleague Peter, the PA will search for him among the contact information available in the VIPconn server. Once the receiver information has been localized, the server sends 2051 command data to the mobile device so that a second voice connection is established 2052 between the user and the addressee. The PA may not be in contact with the caller while the service is being provided, so in the present example, the PA is only in charge of setting up the connection between caller and receiver, being disconnected from the caller while the conversation takes place.

In an alternative embodiment of the present invention, the PA can search on the Internet or another information source for contact details of the addressee specified by the user, in case that such information is not yet available among the user's contact information. This can be useful in a situation when the user for example wants to make a reservation in a restaurant but he does not know the restaurant name.

If the server is not able to establish a connection with the receiver and the PA is reconnected to the user in order to ask for further instructions, these further instructions may be, for example, to send Peter an e-mail. This is with detail explained in FIG. 2c.

Figure 2C:
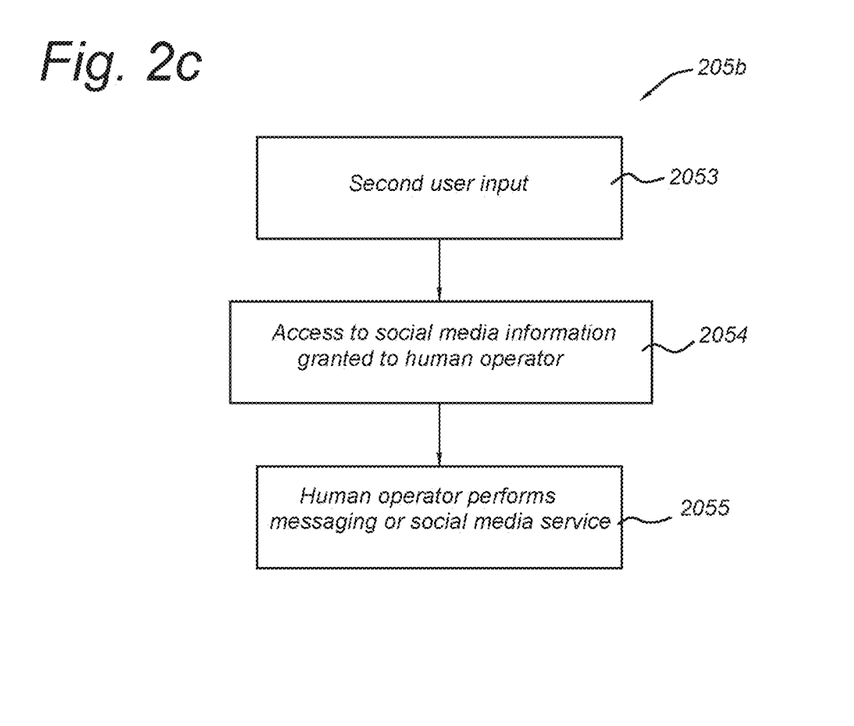
FIG. 2c shows a service provision process performed by a mobile device according to an embodiment of the present invention.

FIG. 2c shows a service provision process performed by a mobile device according to an embodiment of the present invention. In particular, it shows with detail the service provision of step 205 of FIG. 2a when the user requests an internet-based service. By means of a second user input 2053, the mobile device sends authorization information to the server so that the user credentials can be accessed. This authorization information can be a decryption key that allows the server to decrypt the stored user information regarding email accounts, social media accounts or instant messaging messages.

In an embodiment of the present invention, when the access to this social media information is granted 2054, the server can access an internet-based server located in the telecommunications network and the human operator can perform 2055 the requested messaging or social media service.

In an alternative embodiment of the present invention, when the access to the social media information is granted 2054, the PA remotely accesses, from his device, the VIPConn application also installed in the user's mobile device. From the application the PA enters the requested mail application and for example sends the e-mail with the text requested to Peter. Once the task is completed, the PA is again reconnected to the caller in order to confirm the correct execution of the task, and to ask for further instructions.

Figure 3:
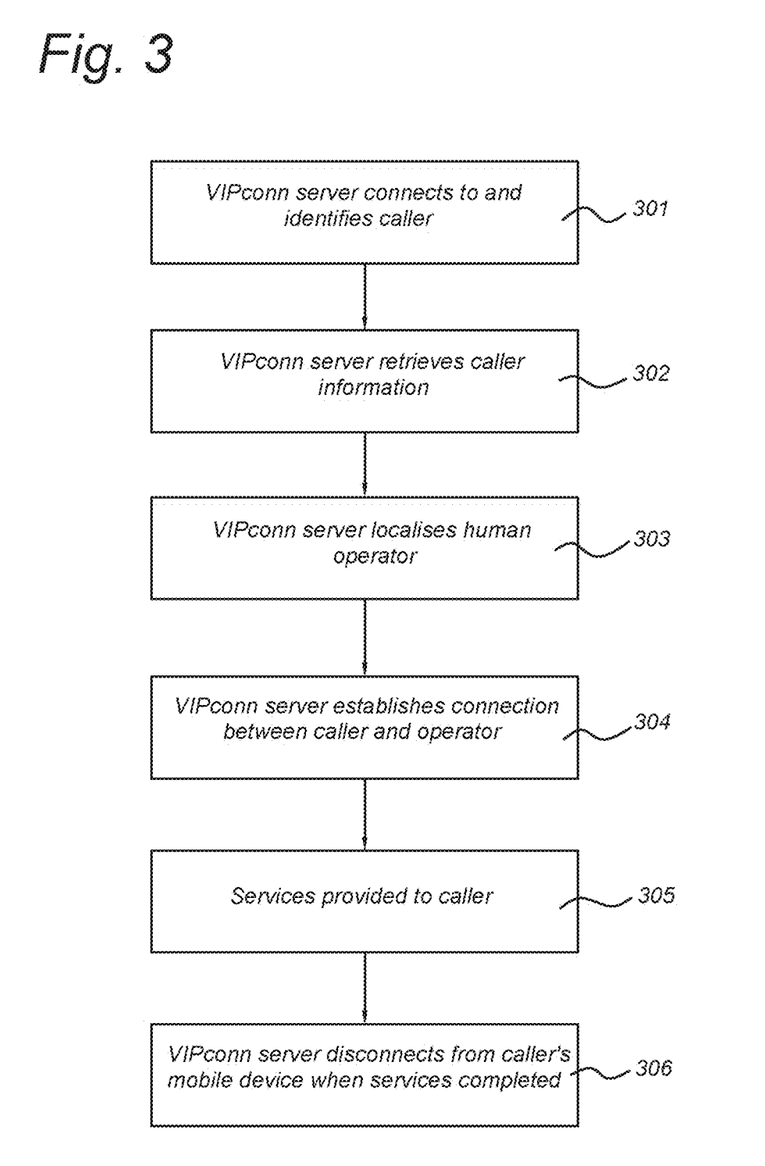
FIG. 3 shows a process performed by a server according to an embodiment of the present invention.

FIG. 3 shows a process 300 performed by a VIPconn server in a telecommunications network when a user of a mobile device in the same network whishes to request a service for exchange of voice and/or data. In step 301 the server notices a new connection and identifies the caller.

In one embodiment of the present invention, the contact and address information of the caller's mobile device is synchronized with the server periodically. The user credentials for internet-based services are also synchronized with the server periodically and in an encrypted form. When the connection with the server is established, the server already has the necessary information and only needs a key for its decryption. This key may be sent by the caller when the connection is established.

In another embodiment, the information is not synchronized previously with the server; but is only sent to the server when the connection is established.

Regardless of when the information is synchronized, which will be discussed in detail later, after the caller is identified, the server retrieves 302 from memory the information related to the said caller. The server contains in memory a list of the PAs and their current availability, so thereafter the server localizes 303 an available PA and establishes 304 a connection between the user of the mobile device and the PA, which is most likely a voice connection. After the PA has received instructions from the caller, if the service to be provided is a phone call, the server tries 305 to connect the caller with the desired receiver. If the service to be provided is the posting of a message on Twitter, the server accesses an internet-based server so that the message is posted via such server. In an alternative embodiment of the present invention, the server performs the remote control of the VIPconn application of the mobile device from the PA's device. Once the services requested by the caller are completed, the server performs the disconnection 306 with the mobile device.

Although in a normal situation the connection between the caller and the server will be terminated when the service is completed, the caller can, at any time, terminate the connection by means of a third user input. The connection can also be terminated by the PA manually, upon request of the user. From that moment, the server is no longer allowed to use the authorization information received from the user to access the user credentials, and therefore the social media information is not accessible any more.

Figure 4A:
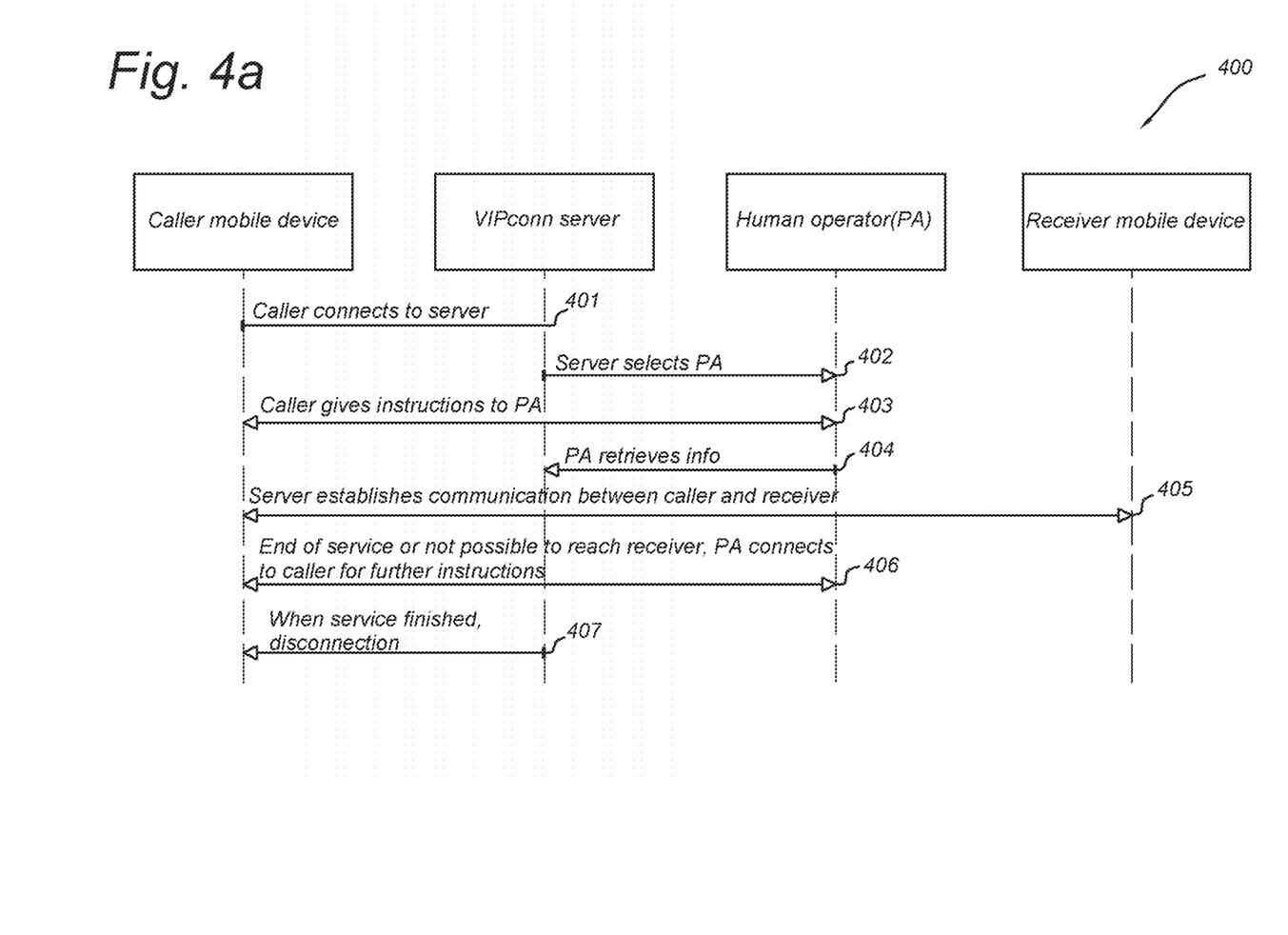
FIG. 4a illustrates a process for voice exchange according to an embodiment of the present invention.

FIG. 4a shows a process 400 for voice exchange according to an embodiment of the present invention. When the user of a mobile device initializes the VIPconn application, connection is established 401 with the VIPconn server, which searches in memory the information related to the identified caller, and selects 403 from memory an available PA to handle the communication with the caller. The server can automatically identify the caller because when the caller synchronizes the contact information of his mobile device, an identifier is assigned by the server to that caller. The PA is then allowed to access 404 the caller's information searched automatically by the server. Thereafter the server establishes 405 a connection between the caller and the PA, being presumably a voice connection. Said connection allows the caller to easily explain to the PA the service required. If the caller wishes to call someone and the server is not able to reach the desired recipient, the server reconnects 406 the caller with the PA so that the PA can ask for further instructions. Similarly, in an alternative embodiment, when the service requested has been completed, the server reconnects 406 the caller with the PA so that the PA can ask for further requests. If no further requests, the server terminates the connection 407 with the mobile device.

From the moment the connection between the mobile device and the server is established, both the mobile device and the server keep track of the duration of the connection, as well as of the type of services provided. This is useful for the user of the mobile terminal to keep an overview of the services, and it is useful for the server for billing purposes with the network providers.

Figure 4B:
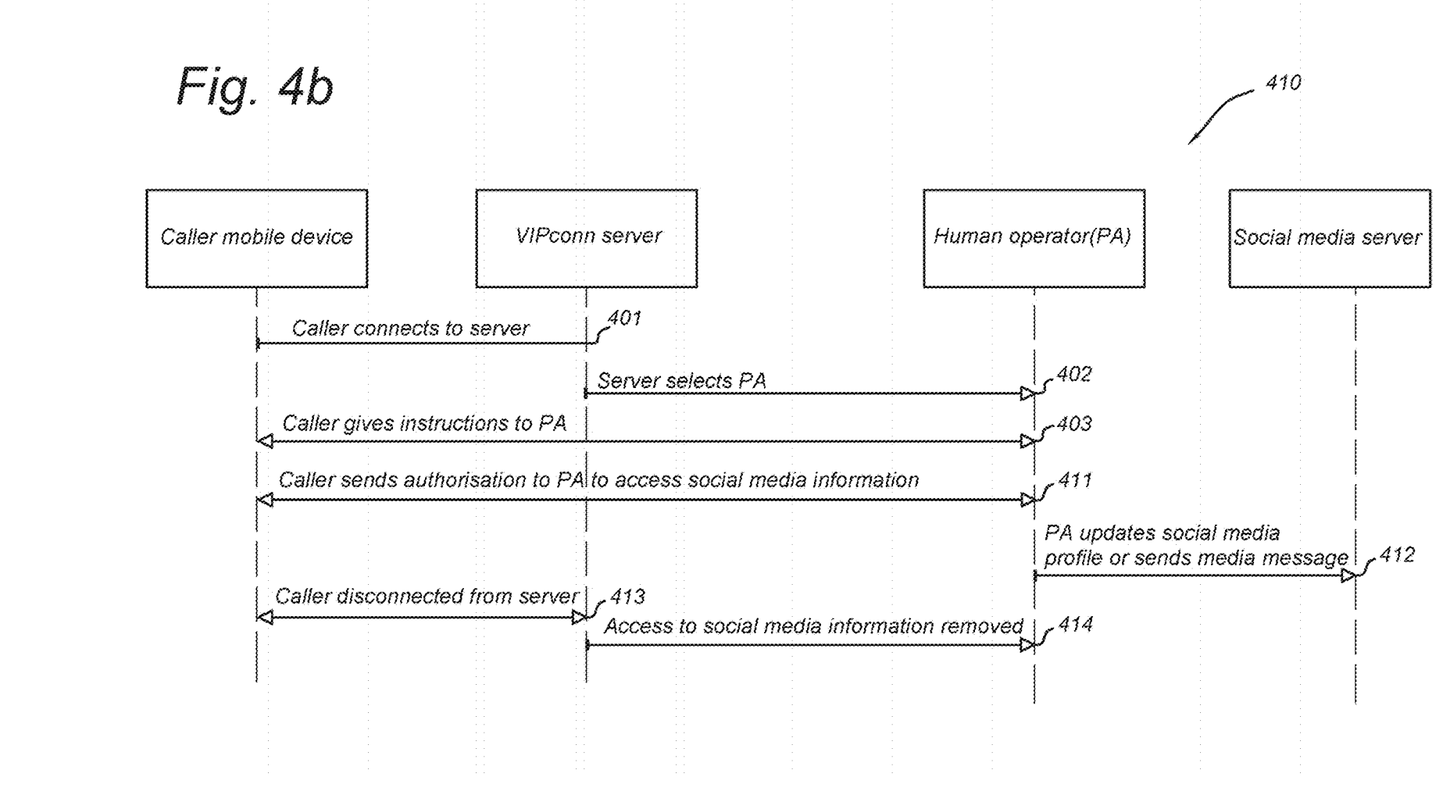
FIG. 4b illustrates a process for data exchange according to an embodiment of the present invention.

FIG. 4b shows a process 410 for data exchange according to an embodiment of the present invention. The first steps of the process are similar to those already disclosed in FIG. 4a. In this case, however, when the user has given instructions to the PA regarding the requested service, the user, via a second user input, allows the mobile terminal to send 411 authorization to the server, and therefore, to the PA, to access the user credentials. From that moment the server can access an internet-based server and the PA can update 412 social media profiles or send a message. When the service has been provided, the user is disconnected from the server 413 and the access to social media information is removed 414 from the server, so that user credentials are no longer available to the server and therefore to the PA.

In an embodiment of the invention, when the user requests a phone call, the connection between the server and the user is terminated when the connection between the user and the addressee of the phone call is established. When the user requests a social media service, the connection may be terminated when the user has given instructions to the PA, having the PA a specific amount of time to perform the requested service, or the connection may be terminated when the PA has successfully performed the requested service and confirmed its completion to the user.

Figure 5A:
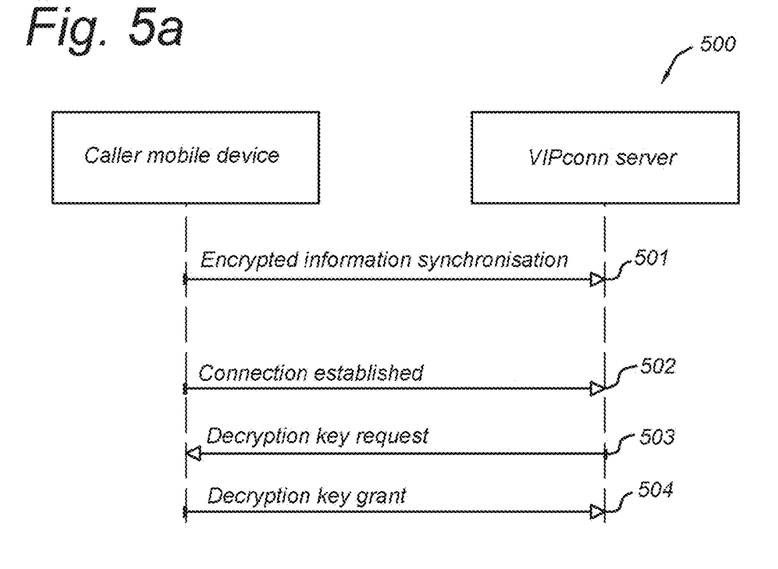
FIG. 5A shows a process for contact information synchronization between a mobile device and a server according to an embodiment of the present invention.

FIG. 5A illustrates a process 500 for synchronizing contact information between a mobile device and the VIPconn server according to an embodiment of the present invention.

As previously introduced, the contact information stored in the mobile device can be periodically synchronized 501 with the VIPconn server. This can be done for example on a daily basis, or whenever the mobile device is connected to the Internet. The synchronized information is however encrypted, and therefore it cannot be accessed from the server until a decryption key is received.

In this embodiment of the present invention, when the connection between the mobile device and the VIPconn server is established 502, the server requests 503 a decryption key to the mobile device. The mobile device immediately sends 504 a decryption key to the server, and from that moment the server has full access to the synchronized information.

Every time the mobile device synchronizes updated information with the server, the decryption key may be different. Other variants can also apply in order to synchronize and then access encrypted information, as will be apparent to those skilled in the art.

Figure 5B:
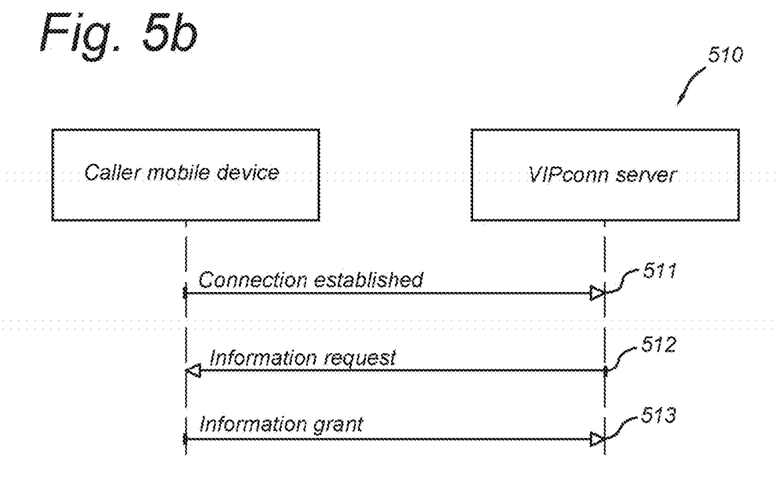
FIG. 5B shows a process for contact information synchronization between a mobile device and a server according to another embodiment of the present invention.

FIG. 5B shows a process 510 for synchronizing contact information between a mobile device and the VIPconn server according to another embodiment of the present invention.

In this embodiment, the contact information stored in the mobile device is not synchronized periodically with the VIPconn server. On the contrary, after the connection between the mobile device and the server is established 511, the server requests 512 the contact information to the mobile device, which is immediately sent 513, so that the server can have access to the required information.

This approach is less resource consuming than the previous approach, because there is no periodic transmission of information, and the server can use its memory more dynamically. On the other hand, this approach presents the disadvantage that it adds a delay to the communication, because the information that the PA needs to access is not available when the connection is established and is more time consuming to send it that to only send the decryption key.

In the foregoing description of the figures, the invention has been described with reference to specific embodiments thereof. It will, however, be evident that various modifications and changes may be made thereto without departing from the scope of the invention as summarized in the attached claims.

In particular, combinations of specific features of various aspects of the invention may be made. An aspect of the invention may be further advantageously enhanced by adding a feature that was described in relation to another aspect of the invention.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. A mobile device comprising:
 a memory for storing contact information of the mobile device,
 a transceiver for exchanging voice and/or data signals within a telecommunications network,
 wherein the mobile device is configured to:
 provide the contact information to a first server in the network,
 initiate, in response to a first user input, a first voice connection to a second server, wherein the first server and the second server are two different entities; and
 receive, from the first server, command data for performing, by the mobile device, a second voice connection to a called party identified in the contact information.

2. The mobile device of claim 1, wherein the first and second servers form a group of connected server devices.

3. The mobile device of claim 1, wherein the mobile device is further configured to, when the mobile device is in a standby state, receive the first user input as a single button push action or a single screen tap action.

4. The mobile device of claim 1, wherein the mobile device is configured to periodically perform the providing of the contact information to the first server in the network.

5. The mobile device of claim 1, wherein the provision of contact information to the first server is done whenever the mobile device has access to the Internet.

6. The mobile device of claim 1, wherein the mobile device is configured to perform the providing of the contact information to the first server in the network when the request of the user is received.

7. The mobile device of claim 1, wherein the contact information includes one or more of contact details including names and telephone numbers, address book information, e-mail messages, instant messaging information, and social networking information.

8. The mobile device of claim 1, wherein the mobile device is further configured to stop providing the first server with contact information when the first voice connection is completed.

9. The mobile device of claim 1, wherein the mobile device is further configured to terminate the connection with the first and second servers at any time upon a third user input.

10. The mobile device of claim 1, wherein the first voice connection with the second server is a voice connection with a human operator connected to the server.

11. The mobile device of claim 1, wherein the provided contact information comprises encrypted information, and upon setup of the connection with the first server, the mobile device sends a key for decrypting the encrypted information.

12. A non-transitory computer-readable medium storing a computer program product comprising computer instructions which, when executed on a processor of a mobile device, cause said mobile device to function according to claim 1.

13. A car system to which a mobile device according to claim 1 can be connected, the car system comprising:
 a user interface element,
 wherein the user interface element is configured to provide the user input for setting up a first voice connection to the server when the mobile device is connected to the car system.

14. The mobile device of claim 1, further configured to send authorization to the first server to access user credentials included in the contact information.

15. A server, the server comprising:
 a transceiver for exchanging data signals within a telecommunications network,
 a memory for storing contact information;
 the server configured to:
 receive contact information from a mobile device in the network, and
 perform a service, said service including
 sending command data from the server to the mobile device for performing, by the mobile device, a second voice connection to a called party identified in the contact information.

16. The server of claim 15, wherein the server forms part a group of connected server devices and is further configured to receive a first voice connection from the mobile device, and to terminate the first voice connection when the service is completed.

17. The server of claim 15, wherein if contact information is not accessible from the mobile device, the server is further configured to provide the mobile device with the lastly received contact information.

18. A non-transitory computer-readable medium storing a computer program product comprising computer instructions which, when executed on a processor of a server, cause said server to function according to claim 15.

19. The server of claim 15, wherein the service to be performed further includes receiving from the mobile device authorization to access user credentials based on the contact information and accessing an internet-based server using the user credentials.

\* \* \* \* \*